US008026198B2

(12) United States Patent
Miller

(10) Patent No.: US 8,026,198 B2
(45) Date of Patent: Sep. 27, 2011

(54) SHALE HYDRATION INHIBITION AGENT(S) AND METHOD OF USE

(75) Inventor: Richard F. Miller, Humble, TX (US)

(73) Assignee: Shrieve Chemical Products, Inc.

(*) Notice: Subject to any disclaimer, the term of this patent is extended or adjusted under 35 U.S.C. 154(b) by 228 days.

(21) Appl. No.: 12/411,709

(22) Filed: Mar. 26, 2009

(65) Prior Publication Data
US 2009/0247429 A1 Oct. 1, 2009

Related U.S. Application Data

(60) Provisional application No. 61/039,673, filed on Mar. 26, 2008, provisional application No. 61/103,471, filed on Oct. 7, 2008, provisional application No. 61/103,450, filed on Oct. 7, 2008.

(51) Int. Cl.
C09K 8/54 (2006.01)
C09K 8/32 (2006.01)
C09K 8/28 (2006.01)
C09K 8/02 (2006.01)
C09K 8/06 (2006.01)
C09K 8/60 (2006.01)
C09K 8/00 (2006.01)
E21B 21/00 (2006.01)

(52) U.S. Cl. ........ 507/130; 507/129; 507/131; 507/133; 507/136; 507/137; 507/140; 507/145; 175/65

(58) Field of Classification Search .................. 507/129, 507/130, 131, 133, 136, 137, 140, 145; 175/65
See application file for complete search history.

(56) References Cited

U.S. PATENT DOCUMENTS

| | | | |
|---|---|---|---|
| 2,761,843 A * | 9/1956 | Brown .......................... | 507/240 |
| 4,216,171 A | 8/1980 | Soula et al. | |
| 4,289,872 A | 9/1981 | Denkewalter et al. | |
| 4,410,688 A | 10/1983 | Denkewalter et al. | |
| 4,507,466 A | 3/1985 | Tomalia et al. | |
| 4,558,120 A | 12/1985 | Tomalia et al. | |
| 4,568,737 A | 2/1986 | Tomalia et al. | |
| 4,587,329 A | 5/1986 | Tomalia et al. | |
| 4,599,400 A | 7/1986 | Tomalia et al. | |
| 4,631,337 A | 12/1986 | Tomalia et al. | |
| 4,666,613 A * | 5/1987 | Schapira et al. .............. | 507/129 |
| 4,690,985 A | 9/1987 | Tomalia et al. | |
| 4,737,550 A | 4/1988 | Tomalia | |
| 4,820,511 A | 4/1989 | Hoeffkes et al. | |
| 4,828,724 A | 5/1989 | Davidson | |
| 4,828,726 A | 5/1989 | Himes et al. | |
| 4,842,073 A | 6/1989 | Himes et al. | |
| 4,845,297 A | 7/1989 | Kumoi et al. | |
| 4,847,342 A | 7/1989 | Peiffer | |
| 4,857,599 A | 8/1989 | Tomalia et al. | |
| 4,889,645 A | 12/1989 | Firth, Jr. | |
| 4,913,585 A | 4/1990 | Thompson et al. | |
| 4,940,764 A | 7/1990 | Meister | |
| 4,990,270 A | 2/1991 | Meister | |
| 5,026,490 A | 6/1991 | Peiffer et al. | |
| 5,041,516 A | 8/1991 | Frechet et al. | |
| 5,066,753 A | 11/1991 | Peiffer et al. | |
| 5,089,151 A | 2/1992 | Hall et al. | |
| 5,097,904 A | 3/1992 | Himes | |
| 5,099,923 A | 3/1992 | Aften et al. | |
| 5,211,250 A | 5/1993 | Kubena, Jr. et al. | |
| 5,330,622 A | 7/1994 | Honnorat et al. | |
| 5,350,740 A | 9/1994 | Patel et al. | |
| 5,380,706 A | 1/1995 | Himes et al. | |
| 5,418,301 A | 5/1995 | Hult et al. | |
| 5,424,284 A | 6/1995 | Patel et al. | |
| 5,530,092 A | 6/1996 | Meijer et al. | |
| 5,558,171 A | 9/1996 | McGlothlin et al. | |
| 5,593,952 A | 1/1997 | Jarrett | |
| 5,610,268 A | 3/1997 | Meijer et al. | |
| 5,698,662 A | 12/1997 | Stoelwinder et al. | |
| 5,705,602 A | 1/1998 | Kawashima et al. | |
| 5,771,971 A | 6/1998 | Horton et al. | |
| 5,908,814 A | 6/1999 | Patel et al. | |
| 6,247,543 B1 * | 6/2001 | Patel et al. ....................... | 175/64 |
| 6,484,821 B1 | 11/2002 | Patel et al. | |
| 6,609,578 B2 | 8/2003 | Patel et al. | |
| 6,831,043 B2 | 12/2004 | Patel et al. | |

(Continued)

OTHER PUBLICATIONS

Huntsman Technical Bulletin No. 0609 "The Use of SURFONAMINE® Amines as Pigment Modifiers and Dispersant Intermediates " (2007, 2009), 5 pages.
Huntsman Technical Bulletin No. 1099, "Teric™ and Ecoteric™ Fatty Acid Ethoxylates" (1999), 2 pages.
"pKa Data Compiled by R. Williams," website:<http://research.chem.psu.edu/brpgroup/pKa_compilation>, 33 pages.
Zwischenprodukte, graphic regarding "Amines—Amination & Reductive Amination," published online by BASF, 1 page.
Huntsman Technical Bulletin No. 5026-1107 "N-Aminopropylmorpholine (APM)" (2007), 4 pages.

(Continued)

Primary Examiner — Timothy J. Kugel
Assistant Examiner — Atnaf Admasu
(74) Attorney, Agent, or Firm — Porter Hedges LLP; Timothy S. Westby

(57) ABSTRACT

A water-based drilling fluid and method of using same are presented in this disclosure, which fluid is used in drilling wells through a formation containing a shale that swells in the presence of water. The drilling fluid comprises an aqueous based continuous phase; a weighting material; and a shale hydration inhibition agent (SHIA) selected from the group consisting of propylamine derivatives, hydrogenated poly (propyleneimine) dendrimers (HPPID), and polyamine twin dendrimers (PTD). In some embodiments, the SHIA of this disclosure is not hydrolyzed at a temperature in the range of from about 100° F. to about 500° F. The drilling fluid may further comprise a fluid loss control agent, an encapsulating agent, other additives, and combinations thereof. A method of reducing shale swelling during wellbore drilling is also described. The method comprises circulating in the subterranean well a water-based drilling fluid comprising an aqueous based continuous phase, a weighting material, and a SHIA.

20 Claims, No Drawings

U.S. PATENT DOCUMENTS 6,857,485 B2    2/2005    Patel et al.
7,084,092 B2    8/2006    Patel et al.
7,250,930 B2    7/2007    Hoffman et al.

OTHER PUBLICATIONS

Huntsman Technical Bulletin No. 5027-1107 "Dimethylaminopropylamine (DMAPA)" (2007), 4 pages.

Huntsman Technical Bulletin No. 5011-0408, "Methoxypropylamine (MOPA)" (2007-2008), 3 pages.

Huntsman Seminar, Sep. 2001, "Surfactants for Oilfield Operations".

Dow Chemical Company Online Publication, "Ethyleneamines"(2001).

Tomalia, et al., "A New Class of Polymers: Starburst-Dendritic Macromolecules", Polym. J., 17(1): 117-132 (1985).

Tomalia, et al., "Starburst Dendrimers: Molecular-Level Control of Size, Shape, Surface Chemistry, Topology and Flexibility from Atoms to Macroscopic Matter", Agnew Chem. Int. Engl., 29:138-175 (1990).

De Brabander-Van Den Berg, E.M.M. And Meijer, E.W., "Poly(propylene imine) Dendrimers: Large-Scale Synthesis by Heterogeneously Catalyzed Hydrogenations", Angew. Chem. Int. Ed. Engl., 32(9): 1308-1311 (1993).

Issherner, et al., "Dendrimers: From Generations and Functional Groups to Functions", Angew. Chem. Int. Ed. Engl., 33: 2413-2420 (1995).

Bosman, et al., About Dendrimers: Structure, Physical Properties and Applications, Chem. Rev., 99:1665-1688 (1999).

Gupta et al., "Polypropylene Imine Dendrimer Mediated Solubility Enhancement: Effect of pH and Functional Groups of Hydrophobes", J. Pharm. Pharmaceut. Sci., 10(3): 358-367 (2007).

International Search Report and Written Opinion dated Nov. 5, 2009 issued in PCT/US2009/038420, 7 pages.

International Preliminary Report on Patentability dated Sep. 28, 2010 issued in PCT/US2009/038420, 5 pages.

\* cited by examiner

SHALE HYDRATION INHIBITION AGENT(S) AND METHOD OF USE

CROSS-REFERENCE TO RELATED APPLICATIONS

This application claims priority from provisional application 61/039,673, filed on Mar. 26, 2008; provisional application 61/103,471, filed on Oct. 7, 2008; and provisional application 61/103,450, filed on Oct. 7, 2008. The disclosures of all three references are hereby incorporated by reference.

BACKGROUND

1. Field of the Invention

The present invention relates generally to drilling fluid compositions and their use. More specifically, the present invention relates to polymers as shale hydration inhibition agents in a drilling fluid composition and method of using same.

2. Background of the Invention

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and acts to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Three types of solids are usually found in water base drilling fluids: 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of either type of formation solids in the drilling fluid can greatly increase drilling time and costs.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces. A unit layer is composed of multiple sheets. One sheet is called the octahedral sheet, it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms. Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers which results in an increased c-spacing. All types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs.

Therefore, there is a continuing need for the development of a drilling fluid composition and method of using same to reduce clay swelling in the oil and gas exploration industry.

SUMMARY

In some embodiments of this disclosure, a water-based drilling fluid is presented, which is used in drilling wells through a formation containing a shale that swells in the presence of water. The drilling fluid comprises an aqueous based continuous phase; a weighting material; and a shale hydration inhibition agent (SHIA) selected from the group consisting of (a) propylamine derivatives having the formula R—Y—$(CH_2)_n$—$NH_2$, wherein n=3; Y=O or N; R=one or more —$CH_3$ groups or a morpholino group;

(b) hydrogenated poly(propyleneimine) dendrimers (HPPID) having a core with the formula N(-A-N*)$_3$ and branches with the formula —$H_2$ or -(AN*$H_2$)$_2$, wherein A=$(CH_2)_3$ and N* is the growth point where two additional branches are attached; and (c) polyamine twin dendrimers (PTD) having a core with the formula $H_2N$—$(CH_2)_x$—$NH_2$, wherein $2 \leq x \leq 6$, and branches B with the formula —$(CH_2$—$CH_2$—$CH_2$—$NH_2)$, wherein the core and the branches are arranged as:

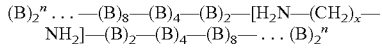

wherein n is the dendrimer growth generation number and n<10. The SHIA of this disclosure is present in an amount that is sufficient to reduce shale swelling.

In an embodiment, a propylamine derivative of this disclosure is 3-methoxypropylamine (MOPA), having the formula $CH_3$—O—$(CH_2)_3$—$NH_2$. In an embodiment, a propylamine derivative of this disclosure is dimethylaminopropylamine (DMAPA), having the formula $(CH_3)_2$—N—$(CH_2)_3$—$NH_2$. In an embodiment, a propylamine derivative of this disclosure is N-aminopropylmorpholine (APM), having the formula:

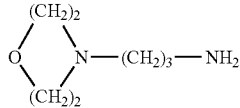

In an embodiment, a HPPID of this disclosure is a first generation HPPID having the formula N-(A-$NH_2$)$_3$, wherein A=$(CH_2)_3$. In an embodiment, a HPPID of this disclosure is a second generation HPPID having the formula N-[A-N(A-$NH_2$)$_2$]$_3$, wherein A=$(CH_2)_3$. In an embodiment, a HPPID of this disclosure is a third generation HPPID having the formula N-{A-N-[A-N(A-$NH_2$)$_2$]$_2$}$_3$, wherein A=$(CH_2)_3$. In some embodiments, the HPPIDs of this disclosure have a molecular weight of from about 150 to about 5800.

In an embodiment, the core of a PTD of this disclosure is selected from the group consisting of ethylene diamine, propylene diamine, and hexamethylene. In an embodiment, a PTD of this disclosure has a molecular weight of from about 250 to about 7500.

In some embodiments, the SHIA of this disclosure is not hydrolyzed at a temperature in the range of from about 100° F. to about 500° F.

In embodiments, the aqueous based continuous phase of the drilling fluid is selected from the group consisting of fresh water, sea water, brine, mixtures of water and water soluble organic compounds, and combinations thereof. In embodiments, the weighting material of the drilling fluid is selected from the group consisting of barite, hematite, iron oxide, calcium carbonate, magnesium carbonate, organic and inorganic salts, and combinations thereof. In an embodiment, the drilling fluid further comprises a fluid loss control agent. In an embodiment, the drilling fluid further comprises an encapsulating agent, selected from the group consisting of synthetic materials, organic materials, inorganic materials, bio-polymers, and combinations thereof.

In some embodiments of this disclosure, a method of reducing shale swelling encountered during the drilling of a subterranean well is described. The method comprises circulating in the subterranean well a water-based drilling fluid comprising an aqueous based continuous phase, a weighting material, and a SHIA selected from the group consisting of (a) propylamine derivatives having the formula R—Y—$(CH_2)_n$—$NH_2$, wherein n=3; Y=O or N; R=one or more —$CH_3$ groups or a morpholino group;

(b) hydrogenated poly(propyleneimine) dendrimers (HPPID) having a core with the formula N(-A-N*)$_3$ and branches with the formula —$H_2$ or -(AN*$H_2$)$_2$, wherein A=$(CH_2)_3$ and N* is the growth point where two additional branches are attached; and (c) polyamine twin dendrimers (PTD) having a core with the formula $H_2N$—$(CH_2)_x$—$NH_2$, wherein $2 \leq x \leq 6$, and branches B with the formula —$(CH_2$—$CH_2$—$CH_2$—$NH_2)$, wherein the core and the branches are arranged as:

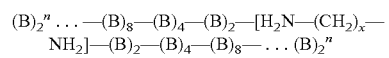

wherein n is the dendrimer growth generation number and n<10. The SHIA of this disclosure is present in an amount that is sufficient to reduce shale swelling.

In some embodiments, prior to introducing SHIA to a drilling fluid, SHIA is treated with a mineral acid or an organic acid. Suitable acids include hydrochloric acid (HCl), sulfuric acid ($H_2SO_4$), nitric acid ($HNO_3$), phosphoric acid ($H_3PO_4$), carbonic acid, formic acid, acetic acid, propionic acid, benzoic acid, and combinations thereof. In some embodiments, prior to introducing SHIA to a drilling fluid, the pH of SHIA is adjusted to be in the range of from about 6.0 to about 10.0. In some embodiments, prior to introducing SHIA to a drilling fluid, the pH of the drilling fluid is adjusted to be in the range of from about 6.5 to about 12.0.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In this disclosure, the term "subterranean formation" encompasses both areas below exposed earth and areas below earth covered by water such as ocean or fresh water. The term "shale" includes all shale, shale like, and/or clay-containing subterranean formations that exhibit one or more undesirable reactions upon exposure to water-based fluids, wherein undesirable reactions include swelling, disassociation, dispersion, and the like.

In this disclosure, shale hydration inhibition agent(s) is shorthanded as "SHIA" for ease of reference. In this disclosure, poly(propylene imine) is shorthanded as "PPI" for ease of reference; poly(propylene imine) dendrimer(s) is shorthanded as "PPID" for ease of reference; and hydrogenated poly(propylene imine) dendrimer(s) is shorthanded as "HPPID" for ease of reference. In this disclosure, polyamine twin dendrimer is shorthanded as "PTD" for ease of reference.

In the following discussion and in the claims, the terms "including" and "comprising" are used in an open-ended fashion, and thus should be interpreted to mean "including, but not limited to . . . ".

DETAILED DESCRIPTION

Overview

In an embodiment, a water-based wellbore servicing fluid is used as a drilling fluid in subterranean wells that penetrate through a formation containing shale which swells in the presence of water. In an embodiment, the drilling fluid of this disclosure comprises an aqueous continuous phase and a shale hydration inhibition agent (SHIA). In an embodiment, the drilling fluid of this disclosure comprises an aqueous continuous phase, a weighting material, and a SHIA. The aqueous continuous phase may be any water-based fluid that is compatible with the formulation of a wellbore servicing fluid and is compatible with the SHIA disclosed herein.

In an embodiment, the aqueous based continuous phase is selected from: fresh water, sea water, brine, mixtures of water and water soluble organic compounds and mixtures thereof. The aqueous continuous phase is present in an amount that is sufficient to form a water-based drilling fluid. In some embodiments, the aqueous continuous phase is present in the drilling fluid from about 100 to about 30 by volume. In some embodiments, the aqueous continuous phase is present in the drilling fluid from about 95 to about 30 by volume. In some embodiments, the aqueous continuous phase is present in the drilling fluid from about 90 to about 40 by volume.

The SHIA is present at a sufficient concentration to reduce either or both the surface hydration based swelling and/or the osmotic based swelling of the shale. The exact amount of the shale hydration inhibition agent present in a particular drilling fluid formulation is determined by a trial and error method of testing the combination of drilling fluid and shale formation encountered. As a rule of thumb, the SHIA of this disclosure may be used in a drilling fluid at a concentration of from about 1 to about 18 pounds per barrel (lbs/bbl or ppb), alternatively from about 2 to about 18 ppb, alternatively from about 2 to about 12 ppb.

The use of SHIA not only inhibits shale hydration but also achieves other benefits. For example, the SHIAs of this disclosure are compatible with other drilling fluid components; they are thermally stable; they are toxicologically safer; they have better handling properties; and in some cases they are biodegradable. Therefore, the SHIAs of the present disclosure may be broadly utilized in land based drilling operations as well as offshore drilling operations.

In embodiments, a weighting material is included in the drilling fluid composition to increase the density of the fluid so as to prevent kick-backs and blow-outs. Suitable weighting materials include any type of weighting material that is in solid form, particulate form, suspended in solution, or dissolved in the aqueous phase. For example, a weighting material is chosen from barite, hematite, iron oxide, calcium carbonate, magnesium carbonate, organic and inorganic salts, and combinations thereof. The weight material is present in the drilling fluid at a concentration that is effective to prevent kick-backs and blow-outs, which concentration changes according to the nature of the formation under drilling operations.

In some embodiments, in addition to the other components previously noted, materials generically referred to as gelling materials, thinners, and fluid loss control agents, are optionally added to the water-based drilling fluid. Examples of gelling materials in aqueous drilling fluids are bentonite, sepiolite clay, attapulgite clay, anionic high-molecular weight polymer and biopolymers.

Thinners are included in a drilling fluid to reduce flow resistance and control gelation tendencies. They are also used to reduce filtration and filter cake thickness, to counteract the effects of salts, to minimize the effects of water on the formations drilled, to emulsify oil in water, and to stabilize mud properties at elevated temperatures. Examples of suitable thinners in aqueous drilling fluids are lignosulfonates, modified lignosulfonates, polyphosphates, tannins, and low molecular weight polyacrylates.

In some embodiments, a fluid loss control agent is added to the drilling fluid composition. Examples of suitable fluid loss control agents include synthetic organic polymers, biopolymers, and mixtures thereof. Other examples include modified lignite, polymers, modified starches, and modified celluloses.

In some embodiments, the drilling fluid further comprises an encapsulating agent, which is generally chosen from synthetic materials, organic materials, inorganic materials, biopolymers, and mixtures thereof. The encapsulating agents may be anionic, cationic or non-ionic in nature. In some embodiments, other additives are included in the drilling fluid composition, such as lubricants, penetration rate enhancers, defoamers, corrosion inhibitors, and lost circulation fluids.

In an embodiment, the drilling fluid of this disclosure further comprises a thickening agent, a shale encapsulator, and other additives such as corrosion inhibitors, lubricity additives. In an embodiment, the drilling fluid of this disclosure may further comprise additional components, such as weighting agents, viscosity agents, fluid loss control agents, bridging agents, lubricants, anti-bit balling agents, neutralizing agents, corrosion inhibition agents, alkali reserve materials and pH buffering agents, surfactants and suspending agents, penetration enhancing agents, proppants, sand for gravel packing, and other similar solids. Other additional components may also be included in the water-based drilling fluid as known to one skilled in the art.

Overview of SHIA

In an embodiment, a drilling fluid composition comprises a SHIA to reduce clay swelling in a wellbore. In some embodiments, the SHIA comprises derivatives of propylamines. In some embodiments, the SHIA comprises hydrogenated poly (propylene imine) dendrimers, i.e., HPPID. In some embodiments, the SHIA comprises polyamine twin dendrimers. In an embodiment, the SHIA is a propylamine derivative. In an embodiment, the SHIA is a HPPID. In an embodiment, the SHIA is a polyamine twin dendrimer (PTD).

Propylamine Derivatives as SHIA

In an embodiment, the SHIA in a drilling fluid composition of this disclosure is a derivative of propylamine having the formula:

R—Y—(CH$_2$)$_n$—NH$_2$ wherein n=3; Y=O or N (both having an unshared pair of electrons); R=one or more —CH$_3$ groups or a morpholino group.

In an embodiment, the SHIA in a drilling fluid composition of this disclosure is 3-methoxypropylamine (MOPA), a derivative of propylamine having the formula:

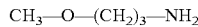

CH$_3$—O—(CH$_2$)$_3$—NH$_2$

In an embodiment, the SHIA in a drilling fluid composition of this disclosure is dimethylaminopropylamine (DMAPA), a derivative of propylamine having the formula:

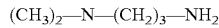

(CH$_3$)$_2$—N—(CH$_2$)$_3$—NH$_2$

In an embodiment, the SHIA in a drilling fluid composition of this disclosure is N-aminopropylmorpholine (APM), a derivative of propylamine having the formula:

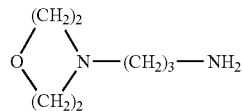

wherein R=a cyclic morpholino group and Y=N.

In embodiments, propylamine derivatives as disclosed herein may be used in a drilling fluid at a concentration of from about 1 to about 20 pounds per barrel (lbs/bbl or ppb), alternatively from about 2 to about 18 ppb, alternatively from about 2 to about 12 ppb.

In an embodiment, a method of reducing shale swelling in a wellbore comprises circulating in the well a water-based drilling fluid composition comprising an aqueous continuous phase, a weighting material, and a SHIA, wherein the SHIA comprises at least one propylamine derivative as disclosed herein.

In embodiments, propylamine derivatives are generally highly soluble in aqueous drilling fluids. Acid treatment of propylamine derivatives increases their solubility in aqueous drilling fluids.

In some embodiments, the propylamine derivatives as SHIA in a water-based drilling fluid composition, before being introduced into the drilling fluid composition, is pretreated with an acid so that the pH is adjusted to be in the range of 6.0-10.0, alternatively in the range of 6.5-9.5, alternatively in the range of 7.0-9.0. Suitable acids for this pretreatment include mineral acids and organic acids. Examples of mineral acids are hydrochloric acid (HCl), sulfuric acid (H$_2$SO$_4$), nitric acid (HNO$_3$), and phosphoric acid (H$_3$PO$_4$). Examples of organic acids are carbonic acid, formic acid, acetic acid, propionic acid, and benzoic acid. In some cases, acid treatment increases the solubility of these SHIAs in aqueous drilling fluid compositions. In some cases, acid treatment causes these SHIAs to be less volatile and reduces the smell of these SHIAs. In some cases, acid treatment improves the handling properties of SHIAs so that workers will deal with a relatively pH neutral composition.

In some embodiments, a water-based drilling fluid, before the addition of SHIA, is treated with an acid so that the pH is adjusted to be in the range of 6.5-12.0, alternatively in the range of 7.0-11.0, alternatively in the range of 9.0-10.0. The drilling fluid is pH adjusted to insure better solids wetting, lower corrosion rates, better emulsification, and other desirable properties. Suitable acids for this pretreatment include mineral acids and organic acids. Examples of mineral acids are hydrochloric acid (HCl), sulfuric acid (H$_2$SO$_4$), nitric acid (HNO$_3$), and phosphoric acid (H$_3$PO$_4$). Examples of organic acids are carbonic acid, formic acid, acetic acid, propionic acid, and benzoic acid. The pH of the drilling fluid after the addition of SHIAs substantially remains the same because the amount of SHIAs added is not large enough to cause significant pH changes.

In embodiments, the propylamine derivatives as disclosed herein as the SHIA in a water-based drilling fluid composition are not hydrolyzed in the presence of water. Furthermore, these propylamine derivatives are also stable (not hydrolyzed) at a temperature in the range of from about 100° F. to about 500° F., alternatively from about 150° F. to about 400° F., alternatively from about 150° F. to about 300° F.

Hydrogenated PPI Dendrimers as SHIA

In an embodiment, the SHIA in a drilling fluid composition of this disclosure is a hydrogenated poly(propyleneimine) dendrimer, i.e., HPPID. Dendrimers or dendritic molecules are repeatedly branched molecules. Some dendritic molecules are known and are described, for example, in Angew. Chem. Int. Ed. Engl., 29:138-175 (1990), incorporated herein by reference in its entirety. This article describes a number of different dendrimers, for example polyamidoamine (PAMAM) dendrimers, which are also described in U.S. Pat. No. 4,507,466; and polyethyleneimine (PEI) dendrimers, which are also described in U.S. Pat. No. 4,631,337. The synthesis of the PPI dendrimers of this disclosure is according to the synthetic scheme in Angew. Chem. Int. Ed. Engl., 32(9):1308-1311 (1993), incorporated herein by reference in its entirety.

In some embodiments, Michael Reaction takes place between ammonia and three moles of acrylonitrile at 80° C. for 1 hour to produce tricyanoethylene amine as the core of the dendrimer—step (1) in scheme 1. Tricyanoethylene amine is then reduced with H$_2$ over a Raney Nickel catalyst via hydrogenation reactions—step (2) in scheme 1, which produces aminotrispropylamine as the first generation HPPID. Aminotrispropylamine is further reacted with an additional six moles of acrylonitrile via Michael Reaction for the growth of dendritic branches—step (3) in scheme 1. The resulting product is again reduced with H$_2$ over a Raney Nickel catalyst via hydrogenation reactions—step (4) in scheme 1, which renders the second generation HPPID. This synthesis process may be repeated to grow the dendritic branches, from the core to three branches, to six branches, to twelve branches, which process is called starburst branching.

In embodiments, the MW of HPPID as SHIA used in a drilling fluid composition is in the range of from about 150 to about 5800, alternatively from about 500 to about 2900, alternatively from about 1100 to about 2600. In some embodiments, the molecular weight (MW) of HPPID as SHIA used in a drilling fluid composition is in the range of from about 182 to about 5606, alternatively from about 518 to about 2534, alternatively from about 1190 to about 2534.

In embodiments, HPPID as disclosed herein may be used in a drilling fluid at a concentration of from about 1 to about 20 pounds per barrel (lbs/bbl or ppb), alternatively from about 2 to about 18 ppb, alternatively from about 2 to about 12 ppb.

In an embodiment, a method of reducing shale swelling in a wellbore comprises circulating in the well a water-based drilling fluid composition comprising an aqueous continuous phase, a weighting material, and a SHIA, wherein the SHIA comprises at least one HPPID as disclosed herein.

In embodiments, HPPIDs are generally highly soluble in aqueous drilling fluids. Acid treatment of HPPIDs increases their solubility in aqueous drilling fluids.

In some embodiments, the HPPID as SHIA in a water-based drilling fluid composition, before being introduced into the drilling fluid composition, is pretreated with an acid so that the pH is adjusted to be in the range of 6.0-10.0, alternatively in the range of 6.5-9.5, alternatively in the range of 7.0-9.0. Suitable acids for this pretreatment include mineral acids and organic acids. Examples of mineral acids are hydrochloric acid (HCl), sulfuric acid ($H_2SO_4$), nitric acid ($HNO_3$), and phosphoric acid ($H_3PO_4$). Examples of organic acids are carbonic acid, formic acid, acetic acid, propionic acid, and benzoic acid. In some cases, acid treatment increases the solubility of these SHIAs in aqueous drilling fluid compositions. In some cases, acid treatment causes these SHIAs to be less volatile and reduces the smell of these SHIAs. In some cases, acid treatment improves the handling properties of SHIAs so that workers will deal with a relatively pH neutral composition.

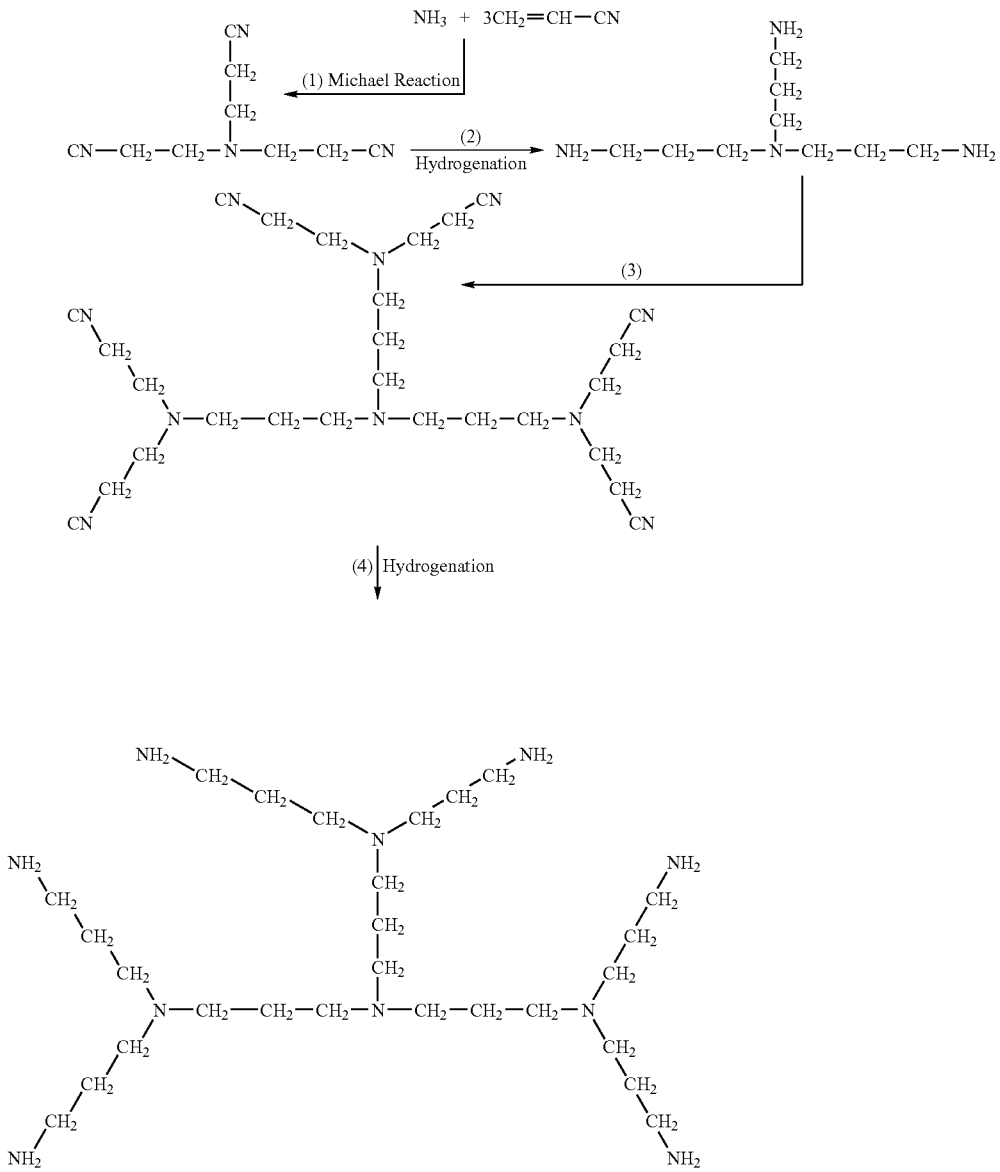

In some embodiments, a water-based drilling fluid, before the addition of SHIA, is treated with an acid so that the pH is adjusted to be in the range of 6.5-12.0, alternatively in the range of 7.0-11.0, alternatively in the range of 9.0-10.0. The drilling fluid is pH adjusted to insure better solids wetting, lower corrosion rates, better emulsification, and other desirable properties. Suitable acids for this pretreatment include mineral acids and organic acids. Examples of mineral acids are hydrochloric acid (HCl), sulfuric acid ($H_2SO_4$), nitric acid ($HNO_3$), and phosphoric acid ($H_3PO_4$). Examples of organic acids are carbonic acid, formic acid, acetic acid, propionic acid, and benzoic acid. The pH of the drilling fluid after the addition of SHIAs substantially remains the same because the amount of SHIAs added is not large enough to cause significant pH changes.

In embodiments, the HPPID as disclosed herein as the SHIA in a water-based drilling fluid composition is not hydrolyzed in the presence of water. Furthermore, these HPPIDs are also stable (not hydrolyzed) at a temperature in the range of from about 100° F. to about 500° F., alternatively from about 150° F. to about 400° F., alternatively from about 150° F. to about 300° F.

Polyamine Twin Dendrimers as SHIA

In an embodiment, the SHIA in a drilling fluid composition of this disclosure is a polyamine twin dendrimer (PTD). In some embodiments, the core of the PTD has the formula:

$$H_2N-(CH_2)_x-NH_2$$

wherein $2 \leq x \leq 6$. Examples of suitable PTD cores include ethylene diamine, propylene diamine, and hexamethylene. Other suitable polyamines for the construction of the PTD of this disclosure are contemplated as known to one skilled in the art.

In an embodiment, PTD is synthesized from ethylene diamine ($H_2N-CH_2CH_2-NH_2$) as the core. Michael Reaction takes place between ethylene diamine and two moles of acrylonitrile ($CH_2=CH-CN$) at 80° C. for 1 hour to produce $NC-CH_2CH_2-[HN-CH_2CH_2-NH]-CH_2-CH_2-CN$, which is then reduced with $H_2$ over a Raney Nickel catalyst to produce the following PTD:

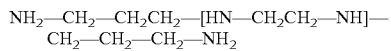

During the hydrogenation reaction, the efficiency of the catalyst decreases and catalyst may be stripped off of the support. In order to avoid product contamination with catalyst, the reaction time is controlled before catalyst stripping takes place.

This process may be repeated to grow longer polyamine twin dendrimers. In another embodiment, 1,3-propane diamine ($H_2N-CH_2-CH_2-CH_2-NH_2$) is utilized as the core for PTDs. In the description to follow, the core for a PTD is represented by "Q" for ease of reference.

In an embodiment, four moles of acrylonitrile ($CH_2=CH-CN$) is reacted with core A via Michael Reaction, the product of which is then reduced with $H_2$ over a Raney Nickel catalyst via hydrogenation reactions, which renders the first generation PTDs. If core A is 1,3-propane diamine, scheme 2 follows:

Scheme 2

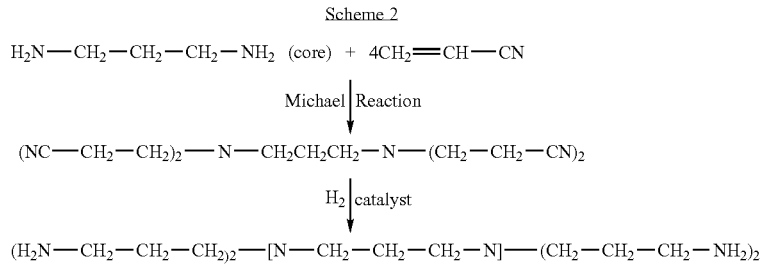

Repeat the above process and let Q=core and B=($CH_2-CH_2-CH_2-NH_2$), the following PTD may be produced: $(B)_4-(B)_2-[Q]-(B)_2-(B)_4$ ($2^{nd}$ generation), $(B)_8-(B)_4-(B)_2-[Q]-(B)_2-(B)_4-(B)_8$ ($3^{rd}$ generation), $(B)_2{}^n \ldots -(B)_8-(B)_4-(B)_2-[Q]-(B)_2-(B)_4-(B)_8- \ldots (B)_2{}^n$ ($n^{th}$ generation)

In embodiments, the molecular weight (MW) of PTD as SHIA used in a drilling fluid composition is in the range of from about 250 to about 7500, alternatively from about 400 to about 3600, alternatively from about 420 to about 1800. In some embodiments, the molecular weight (MW) of PTD as SHIA used in a drilling fluid composition is in the range of from about 294 to about 7014, alternatively from about 448 to about 3430, alternatively from about 448 to about 1638.

In embodiments, PTD as disclosed herein may be used in a drilling fluid at a concentration of from about 1 to about 20 pounds per barrel (lbs/bbl or ppb), alternatively from about 2 to about 18 ppb, alternatively from about 2 to about 12 ppb.

In an embodiment, a method of reducing shale swelling in a wellbore comprises circulating in the well a water-based drilling fluid composition comprising an aqueous continuous phase, a weighting material, and a SHIA, wherein the SHIA comprises at least one polyamine twin dendrimer as disclosed herein.

In embodiments, PTDs are generally highly soluble in aqueous drilling fluids. Acid treatment of PTDs increases their solubility in aqueous drilling fluids.

In some embodiments, the PTD as SHIA in a water-based drilling fluid composition, before being introduced into the drilling fluid composition, is pretreated with an acid so that the pH is adjusted to be in the range of 6.0-10.0, alternatively in the range of 6.5-9.5, alternatively in the range of 7.0-9.0. Suitable acids for this pretreatment include mineral acids and organic acids. Examples of mineral acids are hydrochloric acid (HCl), sulfuric acid ($H_2SO_4$), nitric acid ($HNO_3$), and phosphoric acid ($H_3PO_4$). Examples of organic acids are carbonic acid, formic acid, acetic acid, propionic acid, and benzoic acid. In some cases, acid treatment increases the solubility of these SHIAs in aqueous drilling fluid compositions. In some cases, acid treatment causes these SHIAs to be less volatile and reduces the smell of these SHIAs. In some cases, acid treatment improves the handling properties of SHIAs so that workers will deal with a relatively pH neutral composition.

In some embodiments, a water-based drilling fluid, before the addition of SHIA, is treated with an acid so that the pH is adjusted to be in the range of 6.5-12.0, alternatively in the range of 7.0-11.0, alternatively in the range of 9.0-10.0. The drilling fluid is pH adjusted to insure better solids wetting, lower corrosion rates, better emulsification, and other desirable properties. Suitable acids for this pretreatment include mineral acids and organic acids. Examples of mineral acids are hydrochloric acid (HCl), sulfuric acid ($H_2SO_4$), nitric acid ($HNO_3$), and phosphoric acid ($H_3PO_4$). Examples of organic acids are carbonic acid, formic acid, acetic acid, propionic acid, and benzoic acid. The pH of the drilling fluid after the addition of SHIAs substantially remains the same because the amount of SHIAs added is not large enough to cause significant pH changes.

In embodiments, the polyamine twin dendrimers as disclosed herein as the SHIA in a water-based drilling fluid composition are not hydrolyzed in the presence of water. Furthermore, these PTDs are also stable (not hydrolyzed) at a temperature in the range of from about 100° F. to about 500° F., alternatively from about 150° F. to about 400° F., alternatively from about 150° F. to about 300° F.

EXAMPLES

To further illustrate various embodiments of the present invention, the following examples are provided. These examples are intended to be illustrative, and no limitations to the present invention should be drawn or inferred from the examples presented herein.

The following tests (Examples 1-4) are conducted to demonstrate the maximum amount of API bentonite that can be inhibited by a single 10 pound per barrel (ppb) treatment of propylamine derivatives as the SHIA. The test procedure employs pint jars that are filled to 350 ml with tap water. Ten and a half (10.5) grams of swelling/hydration inhibitor, equaling 10 ppb in the field, is added and the pH is adjusted to a value of at least 9.0 with HCl. To the resulting solution is added a 10 ppb portion of API bentonite and after stirring for 30 minutes, the rheological properties of the slurry are determined and the sample is heat-aged overnight at about 150° F. The following day, the samples are cooled and their rheological properties are again determined. This procedure is carried out until all samples are too thick to measure. Gel Strengths (lbs/100 ft2) are run at 10 seconds and 10 minutes.

Example 1

Typical results are as follows: a polyetheramine available from Huntsman Corporation as D-230 and investigated in Patel et al., U.S. Pat. No. 6,857,485 gave the following rheological results after being tested as described above wherein the clay content of the lab fluid represented 160 ppb. At 170 ppb the fluid became too thick to obtain readings on.

| | |
|---|---|
| Plastic Viscosity (cps) | 50 |
| Yield Point (lbs/100 ft$^2$) | 80 |
| Gel Strength (lbs/100 ft$^2$) | 65/80 |

Example 2

Submitting 3-methoxypropylamine (MOPA) to the same test procedure, at the same treatment concentrations gave the following results. The clay content of the sample was 160 ppb.

| | |
|---|---|
| Plastic Viscosity (cps) | 11 |
| Yield Point (lbs/100 ft$^2$) | 6 |
| Gel Strength (lbs/100 ft$^2$) | 3/12 |

As can be seen, utilizing 3-methoxypropylamine (MOPA) is superior to the use of polyetheramine that is currently practiced because the methyl group attached to the O is an electron donor which increases the amine pKa to 10.11. This is an unusual response. The propyl group has enough flexibility to allow the transfer of electrons with efficiency.

Example 3

To insure that a propyl group separating two atoms each having an unshared pair of electrons (N, O, S), 2-methoxyethylamine purchased from Sigma Aldrich Chemical Company (MOEA, $CH_3$—O—$CH_2$—$CH_2$—$NH_2$) was tested employing the method cited above and the results obtained were compared to 3-methoxypropylamine (MOPA). At 160 ppb, the following results were obtained. It should noted that the pKa for MOEA is 9.2 which supports the flexibility and electron transfer theory attached to the propylamine theory.

| | |
|---|---|
| Plastic Viscosity (cps) | TTTM |
| Yield Point (lbs/100 ft$^2$) | — |
| Gel Strength (lbs/100 ft$^2$) | — |

TTTM = Too Thick To Measure

Example 4

A 3-methoxypropylamine salt, of acetic acid, was employed in the same test procedure detailed above and the following results were obtained at 160 ppb clay.

| | |
|---|---|
| Plastic Viscosity (cps) | 7.5 |
| Yield Point (lbs/100 ft$^2$) | 5 |
| Gel Strength (lbs/100 ft$^2$) | 3/6 |

Comparing salts, at 120 ppb, the results for two MOPA salts, hydrochloric and acetic acid were:

| | HCl | $CH_3COO^-$ |
|---|---|---|
| Plastic Viscosity (cps) | 13 | 7.5 |
| Yield Point (lbs/100 ft$^2$) | 19 | 5 |
| Gel Strength (lbs/100 ft$^2$) | 6/8 | 3/6 |

As can be seen, there is a performance advantage apparently gained from using 3-methoxypropylamine and reacting it with a buffering acid such as acetic and phosphoric acids. In conclusion, the following data could be extrapolated from the test data obtained.

lbs./bbl. at which each Additive was Extrapolated to Fail

| | |
|---|---|
| D-230•HCl | 170 lbs./bbl. (actual data) |
| MOPA•HCl | >190 lbs./bbl. (actual data) |
| MOPA•CH$_3$COO$^-$ | >>190 lbs/bbl. (actual data) |

Example 5

The following test is conducted to demonstrate the maximum amount of API bentonite that can be inhibited by a single 10 pound per barrel (ppb) treatment of a polyamine twin dendrimer as the SHIA. The test procedure employs pint jars which are filled to 350 ml with tap water. Ten and a half (10.5) grams of swelling/hydration inhibitor, equaling 10 ppb in the field, is added and the pH adjusted to a value of at least 9.0. To the resulting solution is added a 10 ppb portion of API bentonite and after stirring for 30 minutes, the theological properties of the slurry are determined and the sample is heat aged overnight at about 150° F. The following day, the samples are cooled and their rheological properties are again determined. This procedure is carried out until all samples are too thick to measure.

To further demonstrate the theory of flexibility and electron transfer 1,1,3,3-tetraaminopropyl propylenediamine, shown below, was tested in the procedure outlined above.

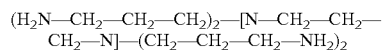

The results obtained were found to be as expected. The clay concentration was purposely made to yield 160 ppb.

| | |
|---|---|
| Plastic Viscosity (cps) | 17 |
| Yield Point (lbs/100 ft$^2$) | 23 |
| Gel Strength (lbs/100 ft$^2$) | 1/8 |

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

REFERENCES

"Surfactants for Oilfield Operations" a seminar sponsored by Huntsman Corporation, September 2001.
"The Use of SURFONAMINE® Amines in Ink and Pigment Applications", Technical Bulletin, Huntsman Corporation, www.huntsman.com.
"Teric™ and Ecoteric™ Fatty Acid Ethoxylates", Surfactants@Huntsman.com.
"pKa Data Compiled by R. Williams", website.
"Ethyleneamines", published online by the Dow Chemical Company, 2001.
"Amines-Amination & Reductive Animation", published online by BASF, http://www2.basf.de/de/intermed/nbd/technologv/amination.htm.
"N-aminopropylmorpholine (APM)" Technical Bulletin, Huntsman Corporation, www.huntsman.com.
"Dimethylaminopropylamine (DMAPA)", Technical Bulletin, Huntsman Corporation, www.huntsman.com.
"Methoxypropylamine (MOPA)", Technical Bulletin, Huntsman Corporation, www.huntsman.com.
Tomalia, et al., "A New Class of Polymers: Starburst-Dendritic Macromolecules", Polym. J., 17(1):117-132 (1985).
Tomalia, et al., "Starburst Dendrimers: Molecular-Level Control of Size, Shape, Surface Chemistry, Topology and Flexibility from Atoms to Macroscopic Matter", Angew. Chem. Int. Ed. Engl., 29:138-175 (1990).
De Brabander-van den Berg, E. M. M. and Meijer, E. W., "Poly (propylene imine) Dendrimers: Large-Scale Synthesis by Heterogeneously Catalyzed Hydrogenations", Angew. Chem. Int. Ed. Engl., 32(9): 1308-1311 (1993).
Issherner, et al., "Dendrimers: From Generations and Functional Groups to Functions", Angew. Chem. Int. Ed. Engl., 33: 2413-2420 (1995).
Bosman, et al., "About Dendrimers: Structure, Physical Properties and Applications, Chem. Rev., 99:1665-1688 (1999).
Gupta et al., "Polypropylene Imine Dendrimer Mediated Solubility Enhancement: Effect of pH and Functional Groups of Hydrophobes", J. Pharm. Pharmaceut. Sci., 10(3): 358-367 (2007).

PATENT REFERENCES

| | | |
|---|---|---|
| 4,820,511 | April 1989 | Hoeffkes, et al. |
| 4,828,724 | May 1989 | Davidson |
| 4,828,726 | May 1989 | Himes et al. |
| 4,842,073 | June 1989 | Himes at al. |
| 4,847,342 | July 1989 | Pfeiffer |
| 4,889,645 | December 1989 | Firth, Jr. |
| 4,913,585 | April 1990 | Thompson et al. |
| 4,940,764 | July 1990 | Meister |
| 4,990,270 | February 1991 | Meister |
| 5,026,490 | June 1991 | Pfeiffer et al. |
| 5,066,753 | November 1991 | Pfeiffer |
| 5,089,151 | February 1992 | Hall et al. |
| 5,097,904 | March 1992 | Himes |
| 5,099,923 | March 1992 | Aften et al. |
| 5,211,250 | May 1993 | Kubena, Jr., et al. |
| 5,330,622 | July 1994 | Honnorat et al. |
| 5,350,740 | September 1994 | Patel et al. |
| 5,380,706 | January 1995 | Himes et al. |
| 5,424,284 | June 1995 | Patel et al. |
| 5,558,171 | September 1996 | McGlothlin et al. |
| 5,593,952 | January 1997 | Jarrett |
| 5,771,971 | June 1998 | Horton et al. |
| 5,908,814 | June 1999 | Patel et al. |
| 6,247,543 | June 2001 | Patel et al. |
| 6,484,821 | November 2002 | Patel et al. |
| 6,609,578 | August 2003 | Patel et al. |
| 6,831,043 | December 2004 | Patel et al. |
| 6,857,485 | February 2005 | Patel et al. |
| 7,250,930 | July 2007 | Patel et al. |
| 4,216,171 | August 1980 | Soula et al. |
| 4,289,872 | September 1981 | Denkewalter et al. |
| 4,410,688 | October 1983 | Denkewalter et al. |
| 4,507,466 | March 1985 | Tomalia et al. |
| 4,558,120 | December 1985 | Tomalia et al. |
| 4,568,737 | February 1986 | Tomalia et al. |
| 4,587,329 | May 1986 | Tomalia et al. |
| 4,599,400 | July 1986 | Tomalia et al. |

| | | |
|---|---|---|
| 4,631,337 | December 1986 | Tomalia et al. |
| 4,690,985 | September 1987 | Tomalia et al. |
| 4,737,550 | April 1988 | Tomalia et al. |
| 4,845,297 | July 1989 | Kumoi et al. |
| 4,857,599 | August 1989 | Tomalia et al. |
| 5,041,516 | August 1991 | Frechet et al. |
| 5,418,301 | May 1995 | Hult et al. |
| 5,530,092 | June 1996 | Meijer et al. |
| 5,610,268 | March 1997 | Meijer et al. |
| 5,698,662 | December 1997 | Stoelwinder et al. |
| 5,705,602 | January 1998 | Kawashima et al. |

The discussion of a reference in the Description of the Related Art is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A water-based drilling fluid for use in drilling wells through a formation containing a shale which swells in the presence of water, the drilling fluid comprising:
   an aqueous based continuous phase;
   a weighting material; and
   a shale hydration inhibition agent (SHIA) selected from the group consisting of
   (a) propylamine derivatives having the formula:

$$R—Y—(CH_2)_n—NH_2$$

wherein n=3; Y=O or N; R=one or more —CH$_3$ groups or a morpholino group;
   (b) hydrogenated poly(propyleneimine) dendrimers (HP-PID) having a core with the formula N(-A-N*)3 and branches with the formula —H$_2$ or -(AN*H$_2$)$_2$
   wherein A=(CH$_2$)$_3$ and N* is the growth point where two additional branches are attached; and
   (c) polyamine twin dendrimers (PTD) having a core with the formula $$H_2N—(CH_2)_x—NH_2$$

wherein 2≦x≦6, and branches B with the formula —(CH$_2$—CH$_2$—CH$_2$—NH$_2$), wherein the core and the branches are arranged as:

$$(B)_2{}^n \ldots —(B)_8—(B)_4—(B)_2—[H_2N—(CH_2)_x—NH_2]—(B)_2—(B)_4—(B)_8— \ldots (B)_2{}^n$$

wherein n is the dendrimer growth generation number and n<10;
   wherein the SHIA is present in a sufficient amount to reduce shale swelling.

2. The propylamine derivative of claim 1 is 3-methoxypropylamine (MOPA), having the formula:

$$CH_3—O—(CH_2)_3—NH_2$$

wherein R=CH$_3$ and Y=O.

3. The propylamine derivative of claim 1 is dimethylaminopropylamine (DMAPA), having the formula:

$$(CH_3)_2—N—(CH_2)_3—NH_2$$

wherein R=(CH$_3$)$_2$ and Y=N.

4. The propylamine derivative of claim 1 is N-aminopropylmorpholine (APM), having the formula:

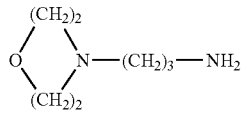

wherein R=a cyclic morpholino group and Y=N.

5. The HPPID of claim 1 is a first generation HPPID having the formula:

$$N-(A-NH_2)_3;$$

wherein A=(CH$_2$)$_3$.

6. The HPPID of claim 1 is a second generation HPPID having the formula:

$$N-[A-N(A-NH_2)_2]_3;$$

wherein A=(CH$_2$)$_3$.

7. The HPPID of claim 1 is a third generation HPPID having the formula:

$$N-\{A-N-[A-N(A-NH_2)_2]_2\}_3;$$

wherein A=(CH$_2$)$_3$.

8. The HPPID of claim 1 has a molecular weight of from about 150 to about 5800.

9. The core of the PTD according to claim 1 is selected from the group consisting of ethylene diamine, propylene diamine, and hexamethylene diamine.

10. The PTD of claim 1 has a molecular weight of from about 250 to about 7500.

11. The method of claim 1, wherein said SHIA is not hydrolyzed at a temperature in the range of from about 100° F. to about 500° F.

12. The drilling fluid of claim 1, wherein said aqueous based continuous phase is selected from the group consisting of fresh water, sea water, brine, mixtures of water and water soluble organic compounds, and combinations thereof.

13. The drilling fluid of claim 1, wherein said weighting material is selected from the group consisting of barite, hematite, iron oxide, calcium carbonate, magnesium carbonate, organic and inorganic salts, and combinations thereof.

14. The drilling fluid of claim 1 further comprises a fluid loss control agent.

15. The drilling fluid of claim 1 further comprises an encapsulating agent, selected from the group consisting of synthetic materials, organic materials, inorganic materials, bio-polymers, and combinations thereof.

16. A method of reducing shale swelling encountered during the drilling of a subterranean well, the method comprising:
   circulating in the subterranean well a water-based drilling fluid comprising an aqueous based continuous phase, a weighting material, and a SHIA selected from the group consisting of
   (a) propylamine derivatives having the formula:

$$R—Y—(CH_2)_n—NH_2$$

wherein n=3; Y=O or N; R=one or more —CH$_3$ groups or a morpholino group;
   (b) hydrogenated poly(propyleneimine) dendrimers (HP-PID) having a core with the formula N(-A-N*)$_3$ and branches with the formula —H$_2$ or -(AN*H$_2$)$_2$
   wherein A=(CH$_2$)$_3$ and N* is the growth point where two additional branches are attached; and
   (c) polyamine twin dendrimers (PTD) having a core with the formula $$H_2N—(CH_2)_x—NH_2$$

wherein 2≦x≦6, and branches B with the formula —(CH$_2$—CH$_2$—CH$_2$—NH$_2$), wherein the core and the branches are arranged as:

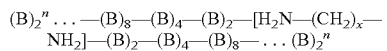

(B)$_2^n$ . . . —(B)$_8$—(B)$_4$—(B)$_2$—[H$_2$N—(CH$_2$)$_x$—NH$_2$]—(B)$_2$—(B)$_4$—(B)$_8$— . . . (B)$_2^n$ wherein n is the dendrimer growth generation number and n<10;
wherein the SHIA is present in a sufficient amount to reduce shale swelling.

17. The method of claim 16 further comprising treating said SHIA prior to introducing SHIA to a drilling fluid with a mineral acid or an organic acid.

18. The method of claim 17, wherein said acid is selected from the group consisting of hydrochloric acid (HCl), sulfuric acid (H$_2$SO$_4$), nitric acid (HNO$_3$), phosphoric acid (H$_3$PO$_4$), carbonic acid, formic acid, acetic acid, propionic acid, benzoic acid, and combinations thereof.

19. The method of claim 16 further comprising adjusting the pH of said SHIA prior to introducing the SHIA to a drilling fluid to be in the range of from about 6.0 to about 10.0.

20. The method of claim 16 further comprising adjusting the pH of a drilling fluid prior to introducing SHIA to the drilling fluid to be in the range of from about 6.5 to about 12.0.

* * * * *